United States Patent [19]

Bastiaansen et al.

[11] Patent Number: 5,879,695

[45] Date of Patent: Mar. 9, 1999

[54] COVERING MATERIAL FOR AGRICULTURAL AND HORTICULTURAL SOIL

[75] Inventors: Antonius Johannes Maria Bastiaansen, Seminarielaan 10, NL-4741 DL Hoeven; Andries Hanzen, Wageningen; Dick De Wit, Bennekom; Huibert Tournois, Rhenen, all of Netherlands

[73] Assignee: Antonius Johannes Maria Bastiaansen, Hoeven, Netherlands

[21] Appl. No.: 809,111

[22] PCT Filed: Sep. 22, 1995

[86] PCT No.: PCT/NL95/00315

§ 371 Date: Mar. 13, 1997

§ 102(e) Date: Mar. 13, 1997

[87] PCT Pub. No.: WO96/09355

PCT Pub. Date: Mar. 28, 1996

[30] Foreign Application Priority Data

Sep. 22, 1994 [NL] Netherlands ............................ 9401542

[51] Int. Cl.⁶ .............................. A01N 25/08; A01G 1/00
[52] U.S. Cl. .................................................. 424/405; 47/9
[58] Field of Search ..................................... 424/405; 47/9

[56] References Cited

U.S. PATENT DOCUMENTS

| 2,957,834 | 10/1960 | Möller et al. | 260/17.2 |
| 3,881,278 | 5/1975 | Videen | 47/58 |
| 5,350,783 | 9/1994 | Reich | 523/124 |

FOREIGN PATENT DOCUMENTS

| 34 31 565 | 3/1985 | Germany. |
| 42 00 855 | 7/1993 | Germany. |
| 91383 | 3/1956 | Netherlands. |
| 98116 | 10/1956 | Netherlands. |
| WO 90/13598 | 11/1990 | WIPO. |

*Primary Examiner*—S. Mark Clardy
*Attorney, Agent, or Firm*—Young & Thompson

[57] ABSTRACT

A covering material for agricultural soil contains starch or a derivative or fraction thereof as binder together with a structure-improving amount of an acid and/or an oil, and a finely divided vegetable filler such as straw. The oil is for instance palm oil or linseed oil in an amount of 1–25 wt. %. The acid is preferably 0.2–4% by weight of phosphoric acid or citric acid. The material may further comprise fungicides, bentonite and/or rubber latices.

10 Claims, No Drawings

COVERING MATERIAL FOR AGRICULTURAL AND HORTICULTURAL SOIL

This application has been filed under 35 USC 371 as the national stage of international application PCT/NL95/00315 filed Sep. 22, 1995.

FIELD OF THE INVENTION

The invention relates to a weed-inhibiting covering material, for agricultural soil, which contains a polymer carbohydrate and a vegetable filler.

BACKGROUND OF THE INVENTION

A covering material of this type is disclosed in Netherlands Patent Application 8402655. The known material consists of a suspension of, for example, cellulose waste (paper) as filler, carboxymethylcellulose or polyvinyl acetate as binder and, in addition, a light-absorbent agent, such as soot, and inhibits the growth of grasses.

According to Swiss Patent 678478, ground in parks and gardens can be protected against weeds by applying a layer of material consisting of felted paper residues, optionally mixed with polystyrene foam. Netherlands patents 91383 and 98116 teach the use of hydroxyalkyl and carboxymethyl starches and swelling starch, respectively, for protecting soil against erosion.

However, the protective effect of the known covering materials is of relatively short duration. Furthermore, these materials also contain poorly degradable constituents (polyvinyl acetate, polystyrene) and mould formation often takes place in the material in the course of time.

SUMMARY OF THE INVENTION

A covering material has now been found which is inexpensive, provides long-lasting (many months) protection against the growth of weeds, protects the soil against erosion and, furthermore, can be applied easily and is completely biodegradable.

The covering material, for agricultural soil, according to the invention therefore contains a polymer carbohydrate as binder and a finely divided vegetable filler and is characterized in that the binder is starch or a fraction or derivative thereof together with a structure-improving amount of an acid and/or an oil.

Surprisingly it has been found that water uptake is lower, even at high RH (relative atmospheric humidity) and, partly as a result of this, the protective effect of the covering material is appreciably better when the polymer carbohydrate used is starch or a fraction or derivative thereof with improved structure. The covering material according to the invention is effective in controlling grasses, weeds, mosses and other undesirable plants, reduces erosion, saves irrigation water and may also promote plant growth.

In this context, agricultural soil is understood to be any soil on which crops can be cultivated, either in the field outdoors or in greenhouses, optionally in trays or pots. Agricultural soil therefore also includes, for example, horticultural soil, (tree) nursery soil, garden soil and potting compost. The soil concerned is in the main natural, optionally cultivated vegetable compost, but also completely or partially synthetic compost.

DETAILED DESCRIPTION OF THE INVENTION

The polymer carbohydrate binder can consist of starch or a fraction or derivative thereof, for at least 50 wt. % or even at least 75 wt. %. Fractions and derivatives are understood to be decomposition products such as amylose and amylopectin and partially depolymerized products, and physically and chemically modified products, such as extruded, dried, oxidized, hydroxyalkylated, carboxymethylated and acetylated starches, and depolymerized, crystallized starches and other forms. Carboxymethyl-starch, native (unmodified) starch, extruded starch and in particular roller-dried starch, which can be converted to a starch solution in cold water and can be obtained, inter alia, under the name Flocgel lvw, have been found to be suitable, amongst others. A polymer carbohydrate means here a carbohydrate having at least 15, especially at least 25 monosaccharide units. In addition to the starch material, the binder may also comprise cellulose and hemicellulose, and derivatives and fractions thereof.

In particular, the structure of the starch material can be improved and the drying thereof can be promoted by adding an oil to it. The term oil should be understood to comprise glycerol esters, in particular triglycerides of medium and long-chain fatty acids. It comprises fats and oils which are liquid at ambient temperature, but also fats that have higher melting points, such as between ambient temperature and about 75° C.

The oil is advantageously a vegetable oil. Vegetable oils which can be used are, for example, linseed oil, rape oil, sunflower oil, coconut oil, palm oil and palm kernel oil. The oil preferably has a melting range above ambient temperature, and in particular between 25° C. and 50° C. Palm oil is the most preferred because it has a favourable melting range and is hydrolyzed to only a slight extent. Linseed oil is another preferred oil. Mixtures of oils can also be used. The amount of oil to be used is, for example, 1–25% by weight, preferably 5–20% by weight and particularly preferentially 8–15% by weight, based on the dry covering material. The oil can be added by simple mixing, after melting if applicable. The oil can also be added by extrusion, e.g. if it is a solid fat.

Alternatively, or in combination, the structure and the weed-resistant effect of the starch material can be improved by the addition of acid. The use of an acid is especially preferred under relatively high humidity conditions. The acid used in the covering material according to the invention is an acid which does not leach out quickly. Examples of such acids are phosphoric acid, oxalic acid, succinic acid, lactic acid, malic acid, benzoic acid, citric acid, gluconic acid, and the like, the preference being for citric acid and phosphoric acid, and the greatest preference being for phosphoric acid. Combinations with these and other acids are also readily possible. The total amount of acid is preferably 0.2–4% by weight, in particular 1–1.5% by weight, based on the entire dry mixture.

Suitable fillers are virtually all finely divided vegetable fillers, such as chaff, straw, hay, hemp, paper and wood. The particle size of the filler is found to be important. If the particles are too large, the layer of covering material becomes too thick and can be more difficult to apply. The particle size is preferably such that the filler passes through a sieve with a mesh size of 2.5 mm and more preferentially passes through a 1 mm sieve. However, the particles must also not be too small, because the drying properties of the filler then become inadequate. Preferably the particles do not pass through a 0.1 mm sieve, and in particular do not pass through a 0.25 mm sieve. Outstanding results have been recorded with finely divided straw having an average particle size of 0.5–1 mm. The vegetable filler can be crushed in any desired way, for example using a hammer mill, pin mill or cutter mill. In the case of straw, the best results are obtained with a hammer mill.

The weight ratio of filler to binder can vary from, for example, 10:1 to 1:2, in particular from 4:1 to 1:1, based on solids.

It was found that the performance of the covering material can be further improved by incorporation of a clay mineral. Suitable clay minerals include e.g. bentonite. The clay mineral may be added in an amount of 3–30%, especially 5–25% by weight, with respect to the total weight of dry binder and filler material and optional oil. The clay mineral causes the covering layer to be stronger and more resistant to rain.

Furthermore it was found that the addition of a latex material improves the resistance of the covering material to rain and wear, whereas the biodegradability was still fully satisfactory. The latex material is preferably a natural latex such as rubber latex, but it may also be a synthetic latex if this is sufficiently degradable, such as a poly (hydroxyalkanoic acid). The latex can be added in an amount of 2–30%, especially 4–20% by weight, with respect to the total weight of dry binder and filler material and optional oil.

If necessary, the covering material can contain other constituents, for example in order further to control undesired plant growth and/or mould growth. For instance, the material can contain a light-absorbent substance, for example carbon, or a fungicide. In general a fungicide will not be needed if the covering is used outdoors, in the open field, but will frequently be needed if the material is used in a greenhouse. Examples of acceptable and effective fungicides are imazalil (especially for starch), azaconazole and propiconazole (especially for cellulose) and cycloheximide. Other possible additives are, for example, plasticisers such as urea or glycerol. All constituents of the covering material must be biodegradable, that is to say must have been completely decomposed, under the influence of organisms present in the ground, into harmless substances within a period of, for example, 6 months to a year.

The covering material can be prepared by mixing all dry constituents, optionally with the exception of the latex if used. The acid can be added at this stage or at a later stage. At the location where the covering layer is applied, the dry mixture can be mixed with a suitable amount of water or other solvent, such that an easily spreadable suspension or slurry is obtained. In general, 5–10 parts of dry mixture are introduced into 90–95 parts of water. The liquid constituents, including, if necessary, the acid and the latex, are added thereto and the whole is mixed. The suspension is then spread over the soil using an amount of 100–1000 g/m$^2$ (10–100 kg/are), in particular 300–700 g/m$^2$, and dried slowly (for example over a period of 1–4 days). A robust layer 1–6 mm thick is thus obtained, which remains intact for several (2–24) months and effectively inhibits weeds.

Any pouring, spraying or atomizing installation can be used for application of the slurry or suspension. One example is an atomizer which contains a disc which rotates about a vertical shaft, the suspension being poured onto said disc and then being strewn in all directions at high speed in atomized form by said disc and spread uniformly over the soil.

EXAMPLE 1

A mixture of 58.7% by weight of finely divided chaff with an average particle size of 0.5–1 mm was mixed with 29.3% by weight of physically destructed potato starch (Flocgel lv) and 10.6% by weight of palm oil. The mixture was mixed with water in a weight ratio of 1:10.

The suspension was mechanically spread over cultivation soil in a ratio of 650 g/m$^2$ (dry matter) and after drying for about 3 days formed a robust layer of about 4 mm thick, which was not washed away by rain and prevented the growth of grasses and other undesirable plants for several months.

EXAMPLE 2

A mixture was prepared according to example 1, to which furthermore 1.4% by weight (with respect to the total dry matter) of citric acid was added. The suspension formed a robust layer of about 4 mm thick after about 3 days and prevented the growth of grasses and other undesirable plants for several months including wet periods.

EXAMPLE 3

A mixture of 58.7% by weight of finely divided straw with an average particle size of 0.5–1 mm, 29.3% by weight roller-dried potato starch (locgel lvw) and 10.6% by weight palm oil was prepared. The mixture was mixed with water in a weight ratio of 1:10.

The resulting suspension was mechanically sprayed in an amount of 500 g/m$^2$ (solids) over compost and after drying for about three days formed a robust layer of about 3 mm thick which was not washed away even in a downpour and also prevented the growth of grasses and other undesirable plants for at least 1 season.

EXAMPLE 4

A mixture was prepared according to example 3, and 1.4% by weight (based on the total dry mixture) of 85% phosphoric acid was added.

The suspension was dry within 3 days even at high atmospheric humidity and was about 3 mm thick after drying. It was not washed away by downpour and prevented the growth of grasses and other undesirable plants for at least 1 season.

EXAMPLE 5

A mixture was prepared according to example 3, and 10% by weight (based on the total dry mixture) of natural rubber latex was added. After application a dry layer of about 3 mm thick after drying. It was not washed away by downpour and prevented the growth of grasses and other undesirable plants for at least 1 season.

We claim:

1. Weed-inhibiting covering material for agricultural soil, comprising:
    starch or a derivative or a fraction thereof as a binder;
    a finely divided vegetable filler having an average particle size of 0.25 mm to 1 mm, and selected from the group consisting of straw, hemp, paper and chaff; and
    a structure-improving amount ranging from 5 to 20% by weight of palm oil.

2. The weed-inhibiting covering material of claim 1, wherein the filler is straw.

3. The weed-inhibiting covering material of claim 1, wherein the material also contains a fungicide.

4. The weed-inhibiting covering material of claim 1, wherein the material also contains 2–30% by weight of a natural rubber latex.

5. Method for protecting crops against weeds, wherein a covering material according to claim 1 is applied in an amount of 100–1000 g/m$^2$, based on solids, to the soil in which the crops are growing.

6. Weed-inhibiting covering material for agricultural soil, comprising:

starch or a derivative or a fraction thereof as a binder;

a finely divided vegetable filler having an average particle size of 0.25 mm to 1 mm, and selected from the group consisting of straw, hemp, paper and chaff; and a structure-improving amount ranging from 0.2 to 4% by weight of an acid selected from the group consisting of citric acid and phosphoric acid.

7. The weed-inhibiting covering material of claim 6, wherein the filler is straw.

8. The weed-inhibiting covering material of claim 6, wherein the material also contains a fungicide.

9. The weed-inhibiting covering material of claim 6, wherein the material also contains 2–30% by weight of a natural rubber latex.

10. Method for protecting crops against weeds, wherein a covering material according to claim 6 is applied in an amount of 100–1000 $g/m^2$, based on solids, to the soil in which the crops are growing.

* * * * *